Figure 1:
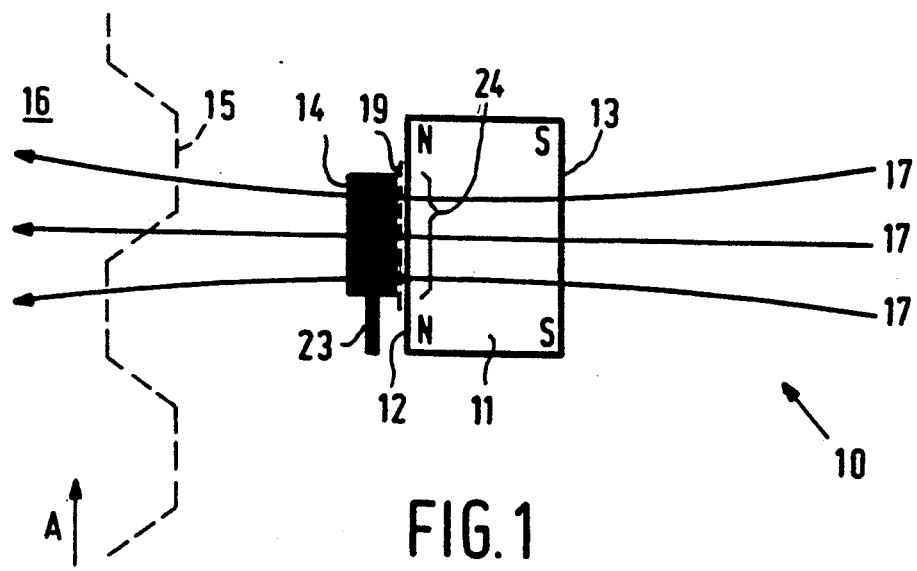

United States Patent [19]

Petersen

[11] Patent Number: 5,210,489
[45] Date of Patent: May 11, 1993

[54] ARRANGEMENT WITH FIELD CORRECTING STRUCTURE PRODUCING A HOMOGENEOUS MAGNETIC FIELD AT A SENSOR ZONE FOR DETECTING MOVEMENT OF A FERROMAGNETIC ELEMENT

[75] Inventor: August Petersen, Henstedt-Ulzburg, Fed. Rep. of Germany

[73] Assignee: U.S. Philips Corporation, New York, N.Y.

[21] Appl. No.: 709,666

[22] Filed: Jun. 3, 1991

[30] Foreign Application Priority Data

Jun. 26, 1990 [DE] Fed. Rep. of Germany ....... 4020228

[51] Int. Cl.$^5$ ................... G01P 3/488; G01B 7/14
[52] U.S. Cl. ................... 324/207.12; 324/174; 324/207.21
[58] Field of Search ............ 324/173, 174, 207.12, 324/207.20, 207.21, 207.25, 235, 251, 252; 338/32 R, 32 H; 307/309

[56] References Cited

U.S. PATENT DOCUMENTS

| | | | |
|---|---|---|---|
| 3,846,697 | 11/1974 | Cila et al. | 324/207.21 X |
| 4,524,932 | 6/1985 | Bodziak | 324/207.2 X |
| 4,712,064 | 12/1987 | Eckardt et al. | 324/207.12 X |
| 4,745,363 | 5/1988 | Carr et al. | 324/235 X |
| 4,853,632 | 8/1989 | Nagano et al. | 324/207.21 |
| 4,937,522 | 6/1990 | Gee | 324/174 |
| 4,992,731 | 2/1991 | Lorenzen | 324/207.2 X |
| 4,992,733 | 2/1991 | Griebeler | 324/207.21 |

FOREIGN PATENT DOCUMENTS 0168381 9/1984 Japan ............... 324/207.21

OTHER PUBLICATIONS

Hans Hellmuth Cuno, Einfache Berechnung von Feldplattendaten in Abhangigkeit von Magnetfeld und Temperatur, Bauteile Report, vol. 14, No. 3, 1976, pp. 89-93.

*Primary Examiner*—Gerard R. Strecker
*Attorney, Agent, or Firm*—Paul R. Miller

[57] ABSTRACT

The invention relates to an arrangement (10) for detecting a moved ferromagnetic element (16) comprising a magnet (11), to which a sensor (14) is assigned on one of its pole faces (12) at a certain distance from the moved element (16). Such arrangements (10) are known, for example, for detecting the speed of a toothed wheel (16). In such known arrangements (10), the positioning of the sensor (14) on the magnet (11) is critical as far as offset voltages in the stationary condition should be avoided in order to obtain a high sensitivity. For an accurate positioning the magnet (11) of such an arrangement (10) has means for producing at least one magnetic imperfection for symmetrization and parallelization of a magnetic field (17) located in the direction of movement (A) of the moved element (16) and of a perpendicular to the pole face (12) for forming a mounting zone (24) free from sensor signal voltage for the sensor (14).

3 Claims, 2 Drawing Sheets

ARRANGEMENT WITH FIELD CORRECTING STRUCTURE PRODUCING A HOMOGENEOUS MAGNETIC FIELD AT A SENSOR ZONE FOR DETECTING MOVEMENT OF A FERROMAGNETIC ELEMENT

The invention relates to an arrangement for detecting a moved ferromagnetic element comprising a magnet, to which a sensor is assigned on one of its pole faces and at a certain distance from the moved element.

BACKGROUND OF THE INVENTION

Arrangements of this kind are used, for example, for recording the speed of rotation or the speed in anti-lock systems. The sensor of such an arrangement, which may be constructed as a magnetic bridge arrangement, should be as free as possible from a sensor signal voltage in the non-detuned condition, i.e. in the stationary condition in the absence of a moved element, in order to ensure a high sensitivity of the arrangement. The stationary magnetic field of the pole surface of a magnet recorded by the sensor must therefore be symmetrical with respect to the sensor, which is substantially unattainable because of manufacturing tolerances and therefore leads to undesired offset voltages.

U.S. Pat. No. 4,745,363 discloses an arrangement, in which, by means of a Hall cell and a magnet, the teeth of a rotating toothed wheel are detected. A groove is provided in one of the pole faces of the magnet transverse to the direction of movement of the teeth of the toothed wheel in order to accommodate at least in part a Hall cell composed of a narrow semiconductor strip because the most sensitive plane detuned magnetically by the teeth of the toothed wheel lies at the area of the surface of the pole face. However, in spite of the groove, the Hall cell projects far beyond this area from the pole face, which is the reason why additional elements are provided for concentrating the magnetic field. The sensitivity of this arrangement strongly depends upon the accurate positioning of the Hall cell in the axis of symmetry of the magnet and is further influenced unfavourably by the projecting Hall cell and the comparatively great distance of the pole face from the toothed wheel connected therewith.

German Offenlegunschrift 34 26 784 A1 discloses an arrangement comprising a magnetoresistive sensor for indicating electrical signals. This sensor has a magnet comprising a central groove, which is aligned in the direction of movement of a toothed wheel and to which a magnetic measuring bridge arrangement is assigned. The groove serves to form an edge at the magnet, as a result of which essentially a homogeneous magnetic field component is to be produced in the plane of the pole face at right angles to the direction of movement. A magnetic detuning of this magnetic field component can then be detected by means of the measuring bridge arrangement. The measuring bridge arrangement is arranged for this purpose in such a manner centrally and at a certain distance from a pole face that it covers in part an edge of the groove. Since also in this arrangement positioning free from offset voltage is extremely difficult, two adjacent bridge arrangements are provided so that occurring offset voltages are to cancel each other. This complicated solution can also solve the problem of the positioning free from offset voltage of the measuring bridge arrangement only conditionally because for this purpose the offset voltages must have the same value, which is not always the case.

A further possibility to position a measuring bridge arrangement is the method of accurately surveying the magnetic field symmetry and then symmetrically mounting the measuring bridge arrangement in the surveyed area, which is also very complicated, however.

A further complicated method is the remagnetization of the magnet in order to obtain field symmetrization at the area of the sensor. For example, this requires a manipulation, which can vary the position of the sensor in the field of the pulse magnetization device then required.

SUMMARY OF THE INVENTION

An object of the invention is to provide a simple sensing arrangement in which a mounting zone is located in a portion of the pole face of a magnet and a sensor is mounted in the mounting zone whereby lines of force penetrate the sensor at substantially right angles thereto.

According to the invention, this object is achieved in that the magnet comprises means for producing field correction in the form of at least one magnetic imperfection for symmetrization and parallelization of a magnetic field (i.e. forming a homogeneous magnetic field) lying in the direction of movement of the element and perpendicular to the pole face for forming a mounting zone for the sensor free from sensor signal voltage.

According to a particular embodiment of the invention, the sensor is a magnetic bridge arrangement, whose individual elements are magneto-resistive and have a Barber pole configuration. The measuring direction of the sensor extends in the direction of movement of the element and parallel to the pole face of the magnet.

According to a preferred embodiment of the invention, the magnet is constructed as a permanent magnet. The moved ferromagnetic element to be detected may be an element rotating about an axis.

According to a preferred embodiment of the invention, the sensor is arranged substantially centrally on the pole face and in the mounting zone, which is determined in the direction of movement of the moved element by the area of influence of at least one imperfection.

According to a preferred embodiment of the invention, the imperfection may have a strip-shaped region at least partly demagnetized or magnetically compensated and extending orthogonally to the direction of movement of the element and in the plane of the pole face.

According to a preferred embodiment of the invention, an imperfection may be constituted by a groove, which extends transversely to the direction of the movement of the element at the area of the centrally arranged sensor. With such an imperfection constituted by a groove, the sensor has in the direction of movement of the element, approximately at the area of the width of the groove in the non-detuned condition, a mounting zone free from sensor signal voltage.

According to a preferred embodiment of the invention, it may also be ensured that at least one electrical conductor, which can be specifically acted upon by current transverse to the direction of movement of the element, is arranged at the edge of the magnet for field symmetrization and constitutes the imperfection. The conductor or conductors is or are further aligned along the pole face and determine by means of their area of influence the width of the mounting zone on the pole face.

With such a single imperfection, it is already possible to arrange the sensor in the direction of movement of the element in a wide central region because a field symmetrization is guaranteed in a wide region. This region can be further enlarged or improved by a further correspondingly arranged conductor. Further, asymmetries on either side of the center line of the magnet can be compensated for. The conductor or conductors may also be arranged in passage openings of the magnet.

According to a preferred embodiment of the invention, it may further be ensured that the conductor or conductors is or are specifically acted upon by such a current that at least in part in the proximity of the conductors regions are formed which have a changed state of magnetization, constitute the imperfections and remain present even in the absence of the current.

According to a particular embodiment of the invention, for stabilization of the magnetoresistive sensor an unsymmetrical magnetic field may be provided in the plane transverse to the direction of movement of the element.

Therefore, by the arrangement according to the invention, offset voltages occurring due to tolerances determined by the manufacture already without external influencing and considerably adversely affecting the operation of the sensor can be avoided or compensated for in a simple manner. A complicated succeeding evaluation circuit may therefore be dispensed with. The magnetoresistive sensor, which according to the invention can be arranged non-critically in the mounting zone, can be secured directly on the pole face of the magnet, for example be adhered thereto by means of an adhesive and/or of a supporting element and therefore measures in the plane which is most sensitive for the magnetic detunings.

If an imperfection in the form of a groove should be formed, the flat magnetoresistive sensor can be arranged fully non-critically with respect to the direction of movement at the area of the groove which corresponds to the mounting zone. If imperfections are formed by means of electrical conductors, a compensation or trimming of the sensor already mounted in the mounting zone is possible afterwards. The mounting of the sensor is very inexpensive and permits obtaining a high sensitivity of the sensor due to a small distance from the element to be detected and due to a good zero point adjustment of the magnetic bridge arrangement.

Further preferred embodiments of the invention are apparent from the Subclaims.

BRIEF DESCRIPTION OF THE DRAWING FIGURES

An embodiment will now be described more fully with reference to a drawing. In the drawing:

FIG. 1 shows an arrangement according to the invention comprising a toothed wheel, a magnet and a sensor within a mounting zone of the magnet.

Figure 2:
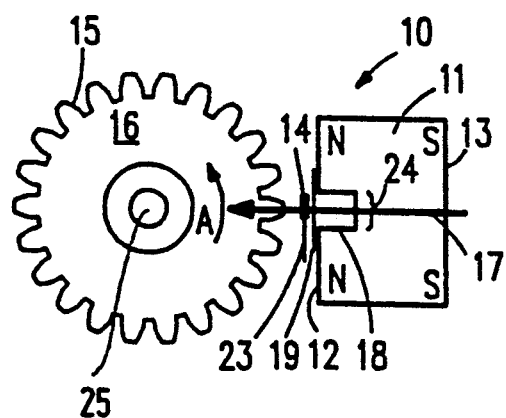
Figure 3:
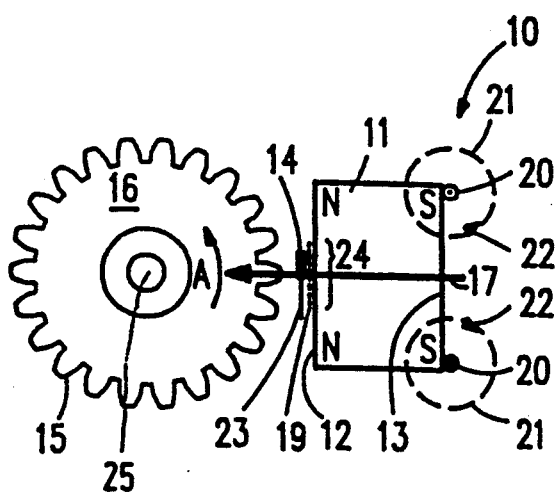
Figure 4:
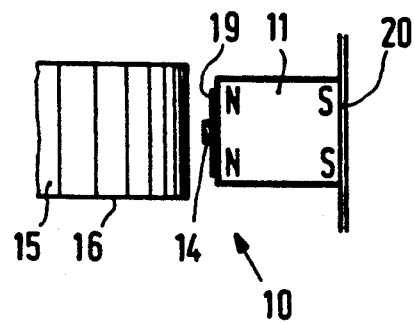
Figure 5:
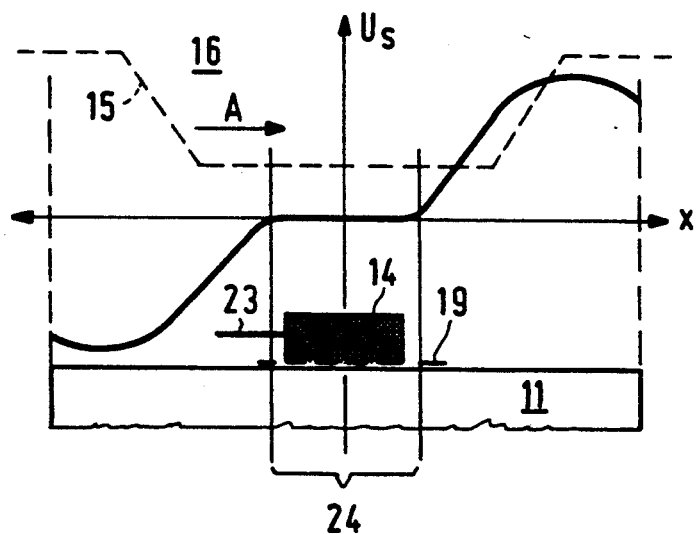

FIG. 2 shows an arrangement as shown in FIG. 1 comprising a groove determining the mounting zone, FIG. 3 shows an arrangement as shown in FIG. 1 comprising several electrical conductors determining the mounting zone, FIG. 4 is a plan view of FIG. 3, and FIG. 5 shows the mounting zone with reference to the qualitative variation of the sensor signal voltage in the direction of a movement of an element to be detected.

DESCRIPTION OF THE INVENTION

FIG. 1 shows an arrangement 10 according to the invention comprising a magnet 11 in the form of a permanent magnet, which has one of its pole faces 12 and 13 a sensor 14 arranged approximately centrally in a mounting zone 24. The sensor 14 can be adhered to the pole face 12 by means of an element 19 or can be secured thereon in a corresponding manner. At a certain distance from the pole face 12 or from the sensor 14, an element 16 rotating about an axis 25 (see FIG. 2 or FIG. 3) in the direction of the arrow A is indicated by dotted lines. The element 16 consists of ferromagnetic material so that it can produce magnetic detunings of the magnetic field 17 of the magnet 11 indicated by arrows. The element 16 may be, for example, the tooth of a rotating toothed wheel, a groove or a pin. It should be noted here that in the drawing the element 16 is shown by way of example only as a toothed wheel with teeth 15.

Due to imperfections for correcting the field of the magnet 11 which are not shown in FIG. 1, a symmetrization and parallelization, or homogeneity, of the magnetic field 17 in a plane lying in the plane of the drawing and passing approximately through the sensor 14 is guaranteed, by which at the pole face 12 the mounting zone 24 is determined. The sensor 14 is constructed magnetoresistively as a magnetic measuring bridge arrangement. Its individual elements have a Barber pole configuration. The sensor 14 is aligned so that its measuring direction corresponds to the tangential direction of movement of the element 16 at the area of the sensor 14, which extends essentially parallel to the pole surface 12 of the magnet 11.

FIG. 2 shows the arrangement 10 according to FIG. 1 comprising an imperfection constituted by a groove 18. The groove 18 is provided centrally in the pole face 12 of the magnet 11 and is aligned so as to point into the plane of the drawing. By means of the imperfection constituted by the groove 18, a symmetrization and parallelization of the magnetic field 17 at the area of the groove 18 on the pole face 12 in a plane lying in the plane of the drawing is guaranteed, which further centrally intersects the magnet 11. This area determines the mounting zone 24. At this area of the pole face 12, the sensor 14 is arranged. For this purpose, it may be required to provide an element 19, which bridges the groove 18, which is non-magnetic and by means of which the sensor 14 can be adhered in a corresponding manner to the magnet 11. The sensor 14 thus arranged can be moved to and fro within the groove width along the direction of movement without this leading to a disturbing offset voltage or sensor signal voltage in the stationary condition. The groove width can then be chosen so that by means of conventional simple mounting methods the sensor 14 can be mounted always within the mounting zone 24.

FIG. 3 shows an arrangement 10 according to FIG. 1 with imperfections constituted by electrical conductors 20. The electrical conductors 20 can be specifically acted upon by a current, i.e., an adjustable current, and are arranged by way of example at the edge of the magnet 11 orthogonally to the direction of movement of the element 16 so as to point into the plane of the drawing. It is conceivable to provide only one conductor 20 and to arrange it in such a manner for example at the edge of the magnet 11 that the desired field symmetrization can be attained. However, it is also conceivable to provide two conductors 20 located opposite to each other and arranged above and below a horizontal center line in the magnet 11 so that asymmetries of the magnetic field 17 on either side of the center line can be compensated for. The variation of the magnetic field around the conductors 20 is indicated for each conductor by a broken line 21. The direction of these magnetic fields depends upon the current direction in the conductors 20, which in turn are again adjusted in accordance with the necessary compensation. The indicated arrows 22 are therefore given only by way of example. It should be noted here that the conductors 20 may of course also be arranged in passage openings of the magnet 11. The mounting zone 24 on the pole face 12 centrally in the plane of the drawing is determined by the imperfections caused by the conductors 20.

As already stated, several conductors 20 may be used and may be acted upon by a continuous current adapted to the compensation requirements. However, it is of course also conceivable to cause a correspondingly adapted current to act only once for a short time iteratively upon the conductors 20 in order to change fully or in part the state of magnetization of the magnet 11 in the proximity of the conductors 20 during the demagnetization or to remagnetize this magnet. During operation of the arrangement, the conductors 20 then need not convey any current, which is the reason why the conductors 20 can also be removed again after the imperfections in the magnet 11 have been produced.

Due to the imperfections, a symmetrical magnetic field prevails in the mounting zone 24, as a result of which the sensor 14 may be arranged, for example, by means of the adhesive elements 19 on the pole face 12, while with respect to the direction of movement of the element 16 a further area is available, without sensor signal voltages being produced in the stationary condition.

FIG. 4 is a plan view of FIG. 3. A conductor 20 is clearly visible, just like the central position of the sensor 14 with respect to the width of the magnet 11. The sensor 14 is adhered by means of the element 19 to the magnet 11. The element 16 is arranged at a certain distance substantially symmetrically opposite to the sensor 14.

FIG. 5 shows the qualitative variation of a sensor signal voltage Us(x), which can be derived at connections 23 of the sensor 14 in the non-detuned condition and is produced at the magnet in the direction of movement A if imperfections according to the invention formed by the groove (18) or the conductors (20) are present. It is particularly clearly visible that in a wide range of x the sensor signal voltage Us is zero in the stationary condition. This range determines the mounting zone 24. According to the invention, the sensor 14 is arranged in this zone.

The features of the invention published in the above description, in the Figures and in the Claims may be essential both separately and in arbitrary combination for the realization of the invention in its various embodiments.

I claim:

1. An arrangement for detecting a ferromagnetic element moving past said arrangement, comprising
   (a) a magnet including a pole face having a mounting zone in a portion of said pole face, said mounting zone being disposed parallel to a direction of movement of a ferromagnetic element moving past said mounting zone,
   (b) field correction means for producing a substantially homogeneous magnetic field at said mounting zone with magnetic lines of force at said mounting zone being substantially at right angles to said pole face, said field correction means comprising a groove in said pole face at said mounting zone, said groove extending through a central part of said pole face substantially orthogonal to said direction of movement of said ferromagnetic element, and
   (c) a sensor mounted in said mounting zone of said magnet so that said magnetic lines of force are substantially at right angles to both said pole face and said mounting zone, said lines of force also penetrating said sensor at substantially right angles,
   wherein said groove has a width exceeding a dimension of said sensor in a direction parallel to said direction of movement.

2. An arrangement for detecting a ferromagnetic element moving past said arrangement, comprising
   (a) a magnet including a pole face having a mounting zone in a portion of said pole face, said mounting zone being disposed parallel to a direction of movement of a ferromagnetic element moving past said mounting zone,
   (b) field correction means for producing a substantially homogeneous magnetic field at said mounting zone with magnetic lines of force at said mounting zone being substantially at right angles to said pole face, said field correction means comprising at least one electrical conductor carrying current to determine size of said mounting zone, said conductor being disposed at an edge of said magnet, and
   (c) a sensor mounted in said mounting zone of said magnet so that said magnetic lines of force are substantially at right angles to both said pole face and said mounting zone, said lines of force also penetrating said sensor at substantially right angles.

3. An arrangement according to claim 2, wherein said field correction means comprises two electrical conductors, each of said two conductors being disposed at different edges of said magnet, said two conductors being disposed symmetrically to said mounting zone.

* * * * *